United States Patent [19]

Kallergis

[11] Patent Number: 4,840,540
[45] Date of Patent: Jun. 20, 1989

[54] PROPELLER WHOSE BLADES ARE PROVIDED WITH SLATS

[75] Inventor: Michael Kallergis, Brunswick, Fed. Rep. of Germany

[73] Assignee: Deutsche Forchungs- und Versuchsanstalt fur Luft- und Raumfahrt e.V., Cologne, Fed. Rep. of Germany

[21] Appl. No.: 210,115

[22] Filed: Jun. 22, 1988

[30] Foreign Application Priority Data

Jun. 27, 1987 [DE] Fed. Rep. of Germany ....... 3721295

[51] Int. Cl.$^4$ .............................................. B64C 11/16
[52] U.S. Cl. ...................... 416/223 A; 416/DIG. 2; 416/200 R; 415/119
[58] Field of Search ............... 416/223 R, 223 A, 234, 416/DIG. 2, 200 R, 200 A; 415/119

[56] References Cited

U.S. PATENT DOCUMENTS

| | | | |
|---|---|---|---|
| 1,021,822 | 4/1912 | Broussouse | 416/200 |
| 1,344,496 | 6/1920 | Flattum | 416/200 |
| 1,684,567 | 9/1928 | Wragg | 416/200 |
| 1,889,717 | 11/1932 | Warfel | 416/200 |
| 3,606,579 | 9/1971 | Mehus | 416/200 |
| 4,687,416 | 8/1987 | Spranger | 416/223 A |

FOREIGN PATENT DOCUMENTS

| | | |
|---|---|---|
| 2634851 | 2/1980 | Fed. Rep. of Germany . |
| 235700 | 12/1944 | Switzerland . |
| 460513 | 1/1937 | United Kingdom . |

OTHER PUBLICATIONS

B. Berdrow et al., "Leiser Antrieb fur die allgemeine Luftfahrt Schluberitcht uber die Definitionsphase", p. XI and translation, Dec. 1976.

VDI-Nachrichten, No. 12, p. 42 and translation, Mar. 20, 1987.

*Primary Examiner*—Robert E. Garrett
*Assistant Examiner*—John T. Kwon
*Attorney, Agent, or Firm*—Salter & Michaelson

[57] ABSTRACT

Directly driven propeller whose propeller blades are provided with slats and which is designed for a lower blade tip Mach number in order to reduce the propeller noise. The slats are rigidly connected to the propeller blades and the slat tips lie on a diameter given by the equation $$D_i = \sqrt{[(LTLP)^2 \cdot a_o^2 - v_\infty^2]}/\pi \cdot n$$

where
LTLP = lower transonic limit of the particular blade configuration including slat
$a_o$ = velocity of sound in air
$v_\infty$ = flight speed
n = propeller rotational speed.

2 Claims, 2 Drawing Sheets

PROPELLER WHOSE BLADES ARE PROVIDED WITH SLATS

BACKGROUND OF THE INVENTION

The invention concerns a propeller of which each blade is provided with a slat which is rigidly connected to the propeller blade and of which the outer radius is smaller than the blade radius.

DESCRIPTION OF THE PRIOR ART

In known propellers (Swiss Pat. No. 235 700, British Pat. No. 460 513), the slats are provided in order to suppress flow separations when the aircraft is at rest and during take-off. In order to avoid deterioration of efficiency when cruising, it is known art to design such slats so that they are adjustable relative to the main blade (Swiss Pat. No. 235 700). It is also known that a relatively small radial extension of the slat over the inner part of the propeller blades suffices to cause a substantial improvement in the thrust when the aircraft is at rest and during take-off because, in this case, flow separation generally only occurs on the inner sections of the propeller blades.

The thrust generated by a propeller results from the propeller blade plan form, the dynamic pressure and the lift coefficient, referred to the individual propeller blade. Given an optimized lift coefficient, high rotational speeds and large propeller diameters are used to achieve high thrust. In the case of business and sports aircraft, helical blade tip Mach numbers above $M_{hel}=0.7$ then occur under the usual operating conditions. Propellers with blade tip Mach numbers in this range lead to intensive propeller noise (in addition to the loud engine noise due to the high take-off power) during the take-off phase.

The propeller noise, which is the main cause of flight noise, can be reduced by reducing the helical blade tip Mach number. However, it is then necessary to maintain the thrust.

In order to satisfy these conditions, it is known art to reduce the propeller noise of general aviation aircraft by reducing the rotational speed (B. Berdrow, "Leiser Antrieb fuer die allgemeine Luftfahrt" (Quiet propulsion for general air transport), Bonn: BMFT, Final Report 1976). In order to maintain the thrust, however, it is necessary to increase the diameter of the propeller and to use reduction gears. In many cases, furthermore, a larger propeller diameter demands a higher undercarriage in order to maintain the necessary propeller ground clearance. Such an undercarriage, together with the reduction gear necessary and the larger propeller, lead to a marked increase in the mass of the aircraft. Such a proposal is, therefore, hardly practical.

In a more recent proposal also (see "VDI-Nachrichten" No. 12, p. 42/Mar. 20, 1987), larger and slower propellers are used to reduce noise generation. In this case, it is assumed that a reduction gear is available in each case.

One possibility of achieving a specified thrust from a propeller at the same rotational speed but with a smaller blade tip Mach number, and hence with less propeller noise, is to use a propeller with an appropriately smaller diameter, but with slats on the blades.

SUMMARY OF THE INVENTION

On the basis of such a propeller, it is the object of the invention to arrange the propeller in such a way that it generates no disadvantageous effects and, in particular, operates without aerodynamic shock and without loss of thrust.

This object is achieved according to the invention in that the slat tips lie on a diameter given by the equation $$D_i = \sqrt{(LTLP)^2 \cdot a_o^2 - v_\infty^2} \ / \pi \cdot n$$

where
- $LTLP$ = the lower transonic limit of the particular blade configuration including slat
- $a_o$ = velocity of sound in air
- $v_\infty$ = flight speed
- $n$ = propeller rotational speed.

Generally speaking, the external diameter of the slat tips can be determined from the following equation $$D_i = \sqrt{[(0.65 \cdot a_o)^2 - v_\infty^2]} \ / \pi \cdot n$$

Propellers of the type mentioned can be designed with any given number of blades as either fixed pitch or variable pitch propellers. In addition, pairs of such propellers can have smaller blade tip diameters.

BRIEF DESCRIPTION OF THE DRAWINGS

The invention is illustrated as an example in the drawing and described below in detail with reference to the drawing.

In the drawing

DESCRIPTION OF THE PREFERRED EMBODIMENT

Figure 1:
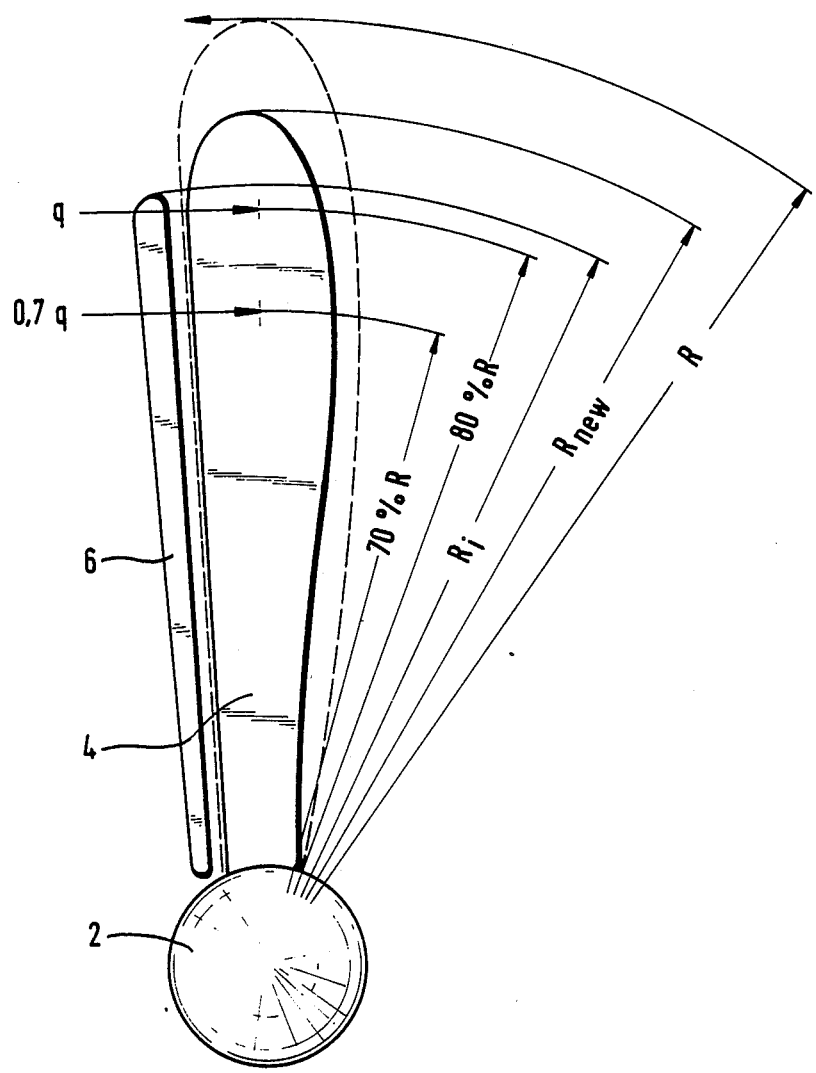
FIG. 1 shows a view of propeller blade with slat in end view.

FIG. 1 shows the propeller hub 2 and one propeller blade 4 of a propeller which may have two or more propeller blades. The propeller blade 4 is provided with a slat 6 solidly attached to it. Also shown (dotted) is a simple propeller blade designed for the same dynamic pressure q. Both propellers are designed for operation at the same rotational speed n, for example n=2600 r.p.m.

Figure 3:
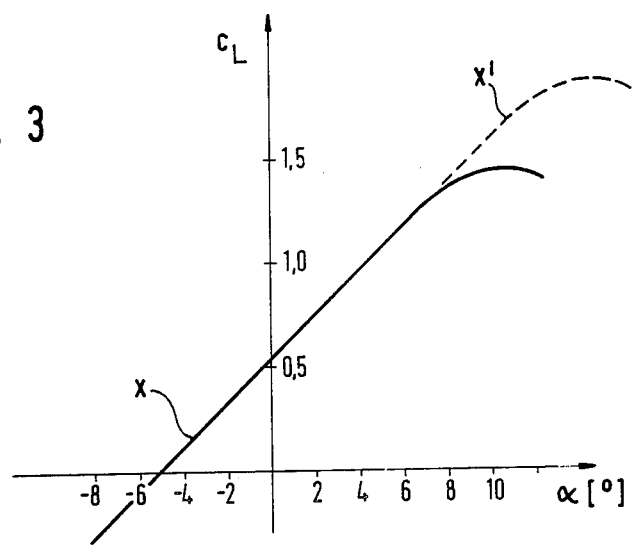
FIG. 3 shows, in a diagram, the relationship between the $c_L$ value and the angle of incidence.

The resulting forces of all the compressive and shear stresses acting on a wing parallel to and at right angles to the incident flow give the drag and lift. The lift and drag are determined, using the corresponding coefficients $c_L$ and $c_D$ from $$L = c_L q_\infty l b \text{ and } D = c_D q_\infty l b,$$

where L is the lift, D is the drag, l is the wing chord, b is the wing length and q is the dynamic pressure. The lift coefficient depends to a large extent on the angle of incidence, as well as on the wing camber. As the angle of incidence $\alpha$ increases, the lift coefficient increases linearly up to a maximum value of $c_{Lmax}$ and, with a further increase in the $\alpha$-angle, it then decreases abruptly, as shown in FIG. 3, because the flow separates on the suction side of the airfoil section.

Referred to a propeller blade, the thrust—like the lift of an airfoil section—depends on the plan form, the dynamic pressure and the lift coefficient. The lift coefficients $c_L$ of modern propeller blades are between 1.1 and 1.5. In consequence, high rotational speeds—to provide a high dynamic pressure—and large propeller diameters are used to achieve high thrust.

It is known that the critical factor affecting propeller noise is the absolute velocity, $$w = \sqrt{(v_\infty^2 + u^2)},$$

of the blade tip or the helical blade tip Mach number. The latter is given by $$M_{hel} = (1/a_o) \cdot \sqrt{[v_\infty^2 + (\pi D n)^2]}$$

where $a_o$ is the velocity of sound in air, $v_\infty$ is the flight speed, D is the propeller diameter and n is the rotational speed.

Figure 2:
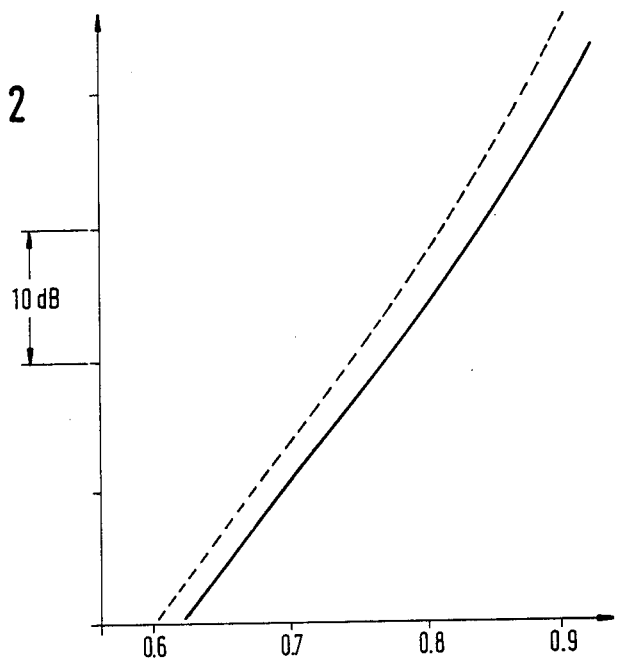
FIG. 2 shows, in a diagram, the way in which the total noise level depends on the helical blade tip Mach number.

In FIG. 2, the total weighted propeller rotational noise in terms of the A-weighted total noise level, is plotted in dB against the helical blade tip Mach number $M_{hel}$, measured in the plane of rotation of the propeller in the case of a thick airfoil section (dotted line) and a thin airfoil section (full line). It may be seen from this diagram that a reduction in the blade tip Mach number of a propeller leads to the total propeller noise level being reduced by more than the same proportion.

By providing a slat and slot as shown in FIG. 1, the separation of the flow on the upper surface of the airfoil section is delayed to a larger angle of incidence relative to the design without a slat. The addition of energy through the slot displaces the separation bubble further downstream so that the pressure difference between the lower surface and the upper surface is increased. By this means, the $c_L (\alpha)$ curve is extended—FIG. 3—to higher $c_L$ values. From the lift equation, compensation for a reduction in the wing plan form is provided by an increase in the $c_L$ value so that the thrust is maintained.

In the case of a propeller with a propeller blade such as that shown dotted in FIG. 1, with a rotational speed n of 2600 r.p.m. and a diameter d of 2 m, the helical blade tip Mach number $M_{hel}$ is 0.82 at a flight speed of 60 m/s. The requirement is now to reduce the total noise by about 12 dB. A may be seen from FIG. 2, this requirement can be met by reducing the helical blade tip Mach number $M_{hel}$ to 0.74. This corresponds to a reduction in diameter of 10% at the same propeller rotational speed and aircraft speed.

The calculation of the necessary aerodynamic values after the proposed changes is based on a conventional propeller blade, all the parameters referring to the propeller with a slat being given the subscript "new". In order to estimate the dynamic pressure, the propeller blade can be considered as a rotating wing where the 80% radius point is considered the point of action of the total thrust. If the slat extends over 95% of the new (shortened) radius and the thrust again acts at about 80% of the slat radius, the new dynamic pressure is then about 70% of the dynamic pressure on the original blade. The slat radius is 85% of the original blade radius and the length of the airfoil section chord in the region of the slat 90%.

Assuming that the lift coefficient of the original blade $c_L$ was previously 1.4, the new value necessary $c_{Lnew}$ is $1.6 \times 1.4$ or approximately 2.2. Lift coefficient values $c_L$ of 2.0, using a slat and slot, have been quoted in the standard literature. In fact, much higher $c_L$ values can be achieved by using such designs. The thrust of the slat configuration can now be determined as $$S_{new} = c_{Lnew} \cdot q_{new} \cdot R_{new} \cdot l_{new} = 1.6 c_L \times 0.7 q \times 0.858 R \times 0.91 = 0.85 S.$$

The remaining 15% of the thrust can be produced by the blade tip over which the slat does not extend.

I claim:

1. Propeller, each of whose blades is provided with a slat which is rigidly connected to the propeller blade, and of which the outer radius is smaller than the blade radius, wherein the slat tips lie on a diameter given by the equation $$D_i = \sqrt{[(LTLP)^2 \cdot a_o^2 - v_\infty^2]} / \pi \cdot n$$

where
LTLP = lower transonic limit of the particular blade configuration including slat
$a_o$ = velocity of sound in air
$v_\infty$ = flight speed
n = propeller rotational speed.

2. Propeller as claimed in claim 1, wherein the slat tips are located on a diameter given by the equation $$D^i = \sqrt{[(0.65 \cdot a_o)^2 - v_\infty^2]} / \pi \cdot n.$$

* * * * *